US007830574B2

(12) United States Patent
Nakatsu

(10) Patent No.: US 7,830,574 B2
(45) Date of Patent: Nov. 9, 2010

(54) LIGHT SCANNING APPARATUS

(75) Inventor: Haruhiko Nakatsu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 12/023,849

(22) Filed: Jan. 31, 2008

(65) Prior Publication Data

US 2008/0186555 A1 Aug. 7, 2008

(30) Foreign Application Priority Data

Feb. 7, 2007 (JP) ............................. 2007-027956

(51) Int. Cl.
*G02B 26/08* (2006.01)

(52) U.S. Cl. .................................... 359/196.1; 359/871

(58) Field of Classification Search .... 359/196.1–226.2
See application file for complete search history.

(56) References Cited

U.S. PATENT DOCUMENTS

| | | | | |
|---|---|---|---|---|
| 2007/0053042 A1 | 3/2007 | Nakatsu | | 359/216 |
| 2008/0117486 A1* | 5/2008 | Andoh et al. | | 359/198 |
| 2009/0027478 A1* | 1/2009 | Peters et al. | | 347/257 |

FOREIGN PATENT DOCUMENTS

| | | |
|---|---|---|
| JP | 4-114121 | 4/1992 |
| JP | 6-337342 | 12/1994 |
| JP | 10/20628 | 1/1998 |
| JP | 2002-267984 | 9/2002 |

* cited by examiner

*Primary Examiner*—James Phan
(74) *Attorney, Agent, or Firm*—Fitzpatrick, Cella, Harper & Scinto

(57) ABSTRACT

A light scanning apparatus according to the invention includes a reflecting mirror, a screw, an elastic member, and an optical housing. The reflecting mirror reflects the light beam deflected by deflection unit toward a object to be scanned. The screw supports a reflecting surface of the reflecting member. The elastic member is provided opposite the screw while the reflecting member is interposed therebetween, and the elastic member presses the reflecting mirror against the screw. The optical housing accommodates the reflecting mirror. The light scanning apparatus includes a planar portion having a drawing which can abut on a longitudinal surface of the reflecting mirror, and the planar portion and the longitudinal surface of the reflecting mirror are rigidly bonded by a bonding agent while the drawing receives the longitudinal surface of the reflecting mirror.

5 Claims, 18 Drawing Sheets

SCANNING LINE INCLINATION
WHEN GRATING ELEMENT IS INCLINED BY 10 MINUTES

SCANNING LINE BENDING WHEN INCIDENT LIGHT FLUX OF GRATING ELEMENT IS INCLINED BY 1°

LIGHT SCANNING APPARATUS

BACKGROUND OF THE INVENTION

1. Field of the Invention

The present invention relates to a light scanning apparatus which deflects a light beam from deflection unit toward a object to be scanned using a reflecting member.

2. Description of the Related Art

In a light scanning apparatus used in an image forming apparatus such as a laser beam printer and a digital copying machine, a light beam which is emitted from light source means while optically modulated according to an image signal is periodically deflected by deflection unit such as a rotary polygon mirror. The light beam from the deflection unit is caused to converge in a spot shape on a object to be scanned such as a photosensitive drum and a photosensitive belt using an imaging optical element having an f-θ property, thereby forming a latent image.

Some of the pieces of light scanning apparatus have reflecting mirrors for folding the light beam in the apparatus in order to downsize the apparatus or to irradiate the object to be scanned with a light beam having a desired angle. The reflecting mirror for reflecting the light beam deflected by the deflection unit toward the object to be scanned is formed in a so-called long mirror. In such long reflecting mirrors, one of end sides in a longitudinal direction is supported by two points, and the other end side is supported by a single point, which secures flatness in disposing the long reflecting mirror in the light scanning apparatus. More specifically, generally each support position on the two-point support side is received away from each end portion in a crosswise direction of the mirror by a predetermined length, and the support position on the single-point support side is received in the substantially central portion in the crosswise direction of the mirror. There are also proposed a long reflecting mirror, wherein the support position on the single-point support side substantially coincides with one of the support positions on the two-point support side in the crosswise direction, and a long reflecting mirror, wherein the support position on the single-point support side is biased toward one side from the crosswise central portion of the mirror (see Japanese Patent Application Laid-Open (JP-A) No. 4-114121).

However, in the conventional support method, sometimes rotation vibration is generated about the support point particularly on the single-point support side due to vibration caused by a drive source of the image forming apparatus, which results in generation of a defective image (so-called uneven pitch).

In order to solve the problem, there is proposed a reflecting mirror which is bonded to a reflecting mirror retaining portion (see JP-A Nos. 6-337342 and 10-20628). In JP-A No. 6-337342, the reflecting mirror is retained in a side plate hole made in a mirror retaining side plate, a reflecting surface is supported by a projection formed in a part of the side plate hole, and the reflecting mirror is biased from the opposite side by an elastic member. At this point, a gap between the reflecting mirror and the projection of the side plate hole is bonded by a bonding agent, and a gap between the mirror and a portion where the mirror presses the side plate hole by gravity is also bonded by the bonding agent.

In JP-A No. 10-20628, an application thickness of the bonding agent is set smaller than a thickness of the reflecting mirror to consider a mirror angle variation caused by cure shrinkage in hardening the bonding agent. JP-A No. 10-20628 discloses a technique wherein an elastic member is used as means for suppressing the rotation vibration of the mirror instead of the bonding agent.

However, there are following problems in the conventional techniques.

In JP-A No. 10-20628, unfortunately surface accuracy of reflecting mirror is not improved because an end portion of the reflecting mirror is supported by surface contact with a mirror receiving portion. In JP-A No. 6-337342, because the mirror bonding surface and the bonding surface facing the mirror bonding surface are bonded by causing the bonding agent to flow between the mirror bonding surface and the bonding surface facing the mirror bonding surface, unfortunately the position of the mirror is easily displaced to generate the mirror angle variation due to the shrinkage in hardening the bonding agent.

Therefore, JP-A No. 2002-267984 discloses a configuration, wherein the reflecting mirror is fixed by the bonding agent while a mirror side face is received by a projection to suppress a decrease in positional accuracy of the mirror surface. However, depending on a material of the bonding agent, the bonding agent is deformed by receiving a force in a direction parallel to the mirror bonding surface by the rotation vibration of the mirror. Therefore, the vibration cannot be suppressed.

SUMMARY OF THE INVENTION

In view of the foregoing, the invention provides a light scanning apparatus which can prevent the mirror angle variation caused by the deformation of the bonding agent during mirror vibration while suppressing the mirror angle variation in fixing the reflecting mirror with the bonding agent.

A light scanning apparatus according to the invention includes deflection unit which performs scanning while deflecting a light beam emitted from a light source; a reflecting member which reflects the light beam deflected by the deflection unit toward a object to be scanned; a support member which supports a reflecting surface of the reflecting member; an urging member which urges the reflecting member against the support member; an optical box is accommodated in the reflecting member; and a projection which abuts on a longitudinal side of the reflecting surface of the reflecting member, the projection being fixed to the optical box by filling an outer peripheral portion of an abutting portion abutting on the reflecting member with a bonding agent.

Further features of the present invention will become apparent from the following description of exemplary embodiments with reference to the attached drawings.

DESCRIPTION OF THE EMBODIMENTS

An exemplary embodiment of the invention will be described in detail with reference to the drawings. However, dimensions, materials, and shapes of components described in the following embodiments and a relative arrangement among the components shall appropriately be changed depending on a configuration and various conditions of an apparatus to which the invention is applied. Accordingly, the invention is not limited to the sizes, materials, shapes, and relative arrangement of the embodiments unless otherwise noted.

First Embodiment

Figure 12:
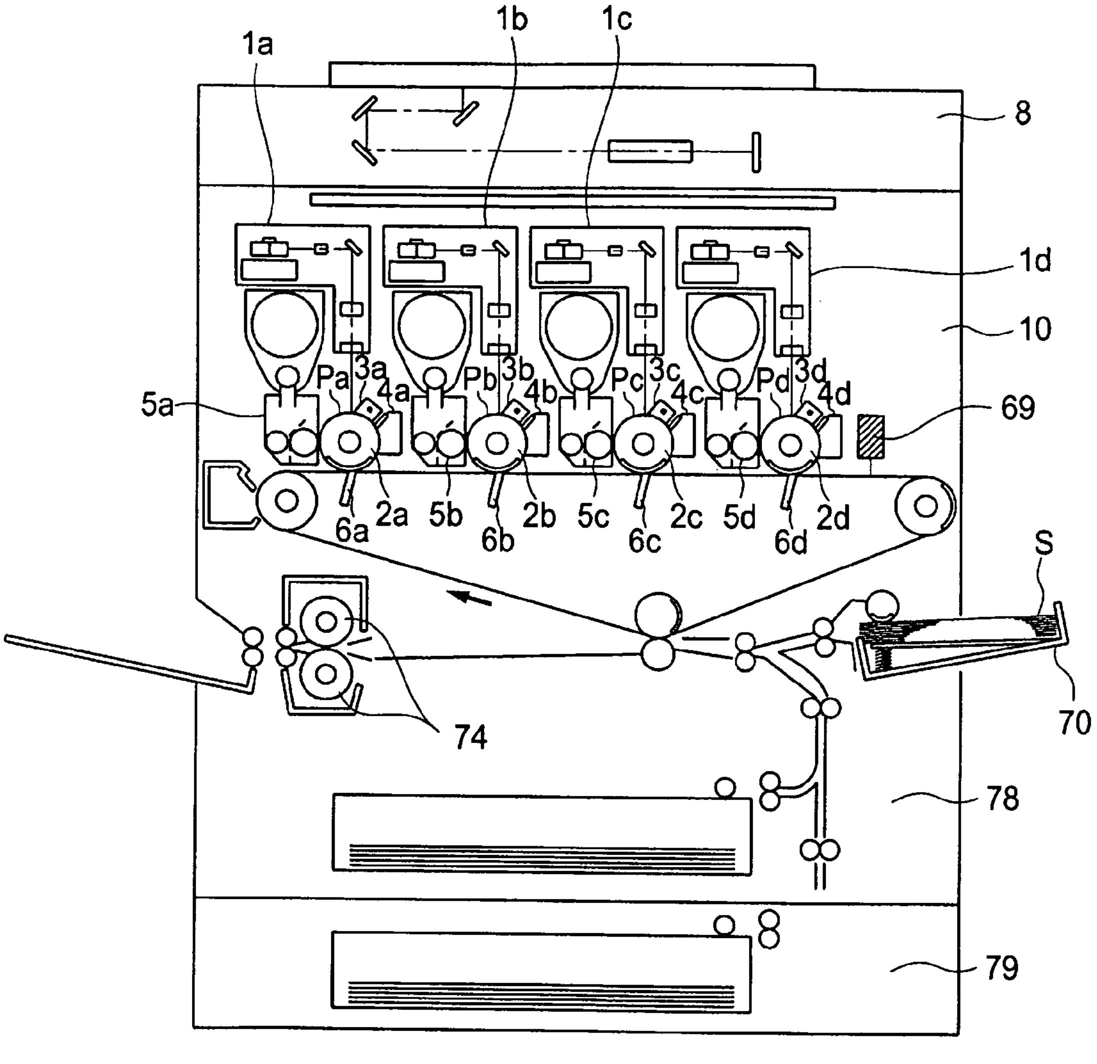
FIG. 12 is a schematic view illustrating a main part of an image forming apparatus in which a light scanning apparatus is incorporated.

FIG. 12 is a schematic view illustrating a main part of a digital full-color copying machine (color image forming apparatus) to which a light scanning apparatus according to a first embodiment of the invention is applied, and FIG. 13 is a schematic view illustrating the light scanning apparatus in the digital full-color copying machine of FIG. 12.

Referring to FIG. 12, a document reading portion 8 reads image information on a document.

A signal read by the document reading portion 8 is converted into yellow, magenta, cyan, and black video signals, and optical modulation is performed to the laser beam outputted from a light scanning apparatus 1 (1*a*, 1*b*, 1*c*, and 1*d*) corresponding to image forming stations Pa, Pb, Pc, and Pd.

In a full-color image forming portion 10, the four image forming stations Pa, Pb, Pc, and Pd are arranged to form an image of each color light beam.

Each image forming station includes a photosensitive drum 2 (2*a*, 2*b*, 2*c*, and 2*d*) which is a object to be scanned. Each image forming station includes charging means 3 (3*a*, 3*b*, 3*c*, and 3*d*), development means 5 (5*a*, 5*b*, 5*c*, and 5*d*), cleaning means 4 (4*a*, 4*b*, 4*c*, and 4*d*), and transfer means 6 (6*a*, 6*b*, 6*c*, and 6*d*). Using these members, overlapped four-color toner images are formed on the intermediate transfer belt 6 by a well-known image forming process.

The toner image on the intermediate transfer belt 6 is secondary-transferred onto a sheet S which is selectively fed from a manually feeding cassette 70 or feeding units 78 and 79 by a well-known sheet conveyance process, and finally the secondary-transferred image is heated and fixed to obtain a full-color image by a pair of fixing rollers 74.

The detailed light scanning apparatus 1 of FIG. 12 will be described below with reference to FIG. 13. Each of the light scanning apparatus 1 has the same configuration.

Figure 13A:
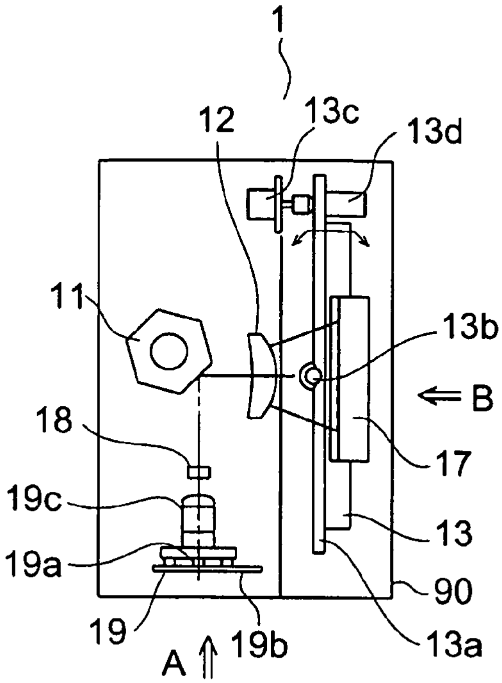
FIG. 13A to 13C are schematic views of the light scanning apparatus.
Figure 13B:
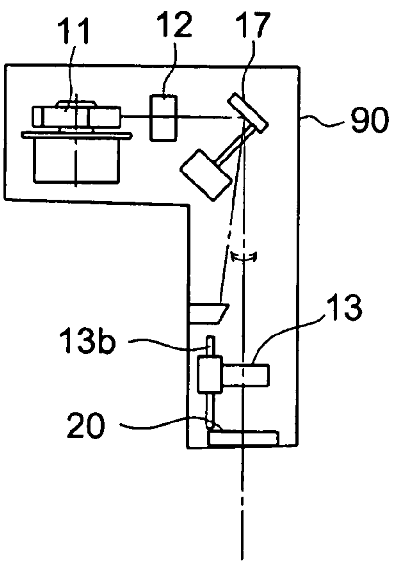
Figure 13C:
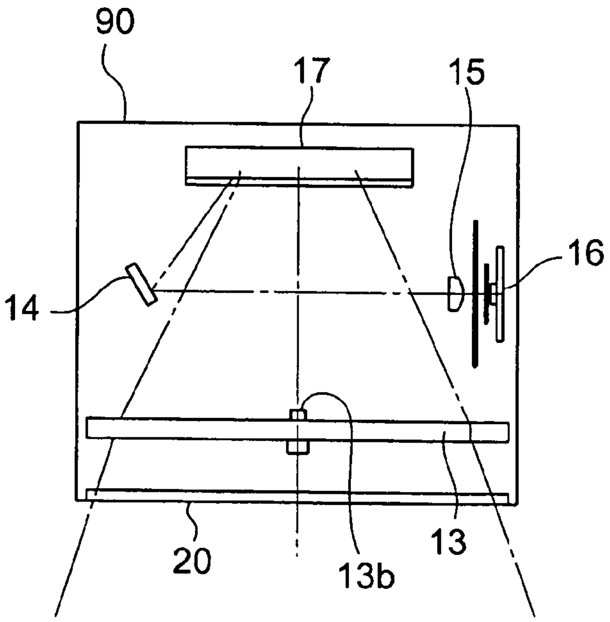

FIG. 13A is a plan view illustrating a main part of the light scanning apparatus, and Figs. FIGS. 13B and 13C are side views illustrating the main part of the light scanning apparatus when viewed from directions of arrow A and B of FIG. 13A respectively. A light source unit 19 which is of a light source emits the light beam. The light source unit 19 includes a laser diode 19*a*, a drive electric board 19*b* for the laser diode 19*a*, a collimator lens tube 19*c*, and an aperture stop (not shown). The light source unit 19 emits a parallel light beam (hereinafter referred to as laser beam). A cylindrical lens 18 has a refractive index in a direction perpendicular to the paper plane. Deflection unit 11 deflects the laser beam to perform the scanning. A so-called f-θ lens 12 and a diffraction element (imaging optical element) 13 image the laser beam onto the photosensitive drum 2 with a predetermined spot diameter. A reflecting mirror (reflecting member) 17 is of reflection means which reflects the laser beam deflected by the deflection unit 11 toward the photosensitive drum 2. A dust-proof glass 20 is retained while slidably inserted in and retracted from an optical housing (optical box) 90. A synchronization detecting means 16 detects laser beam write timing (synchronous signal) in each line on the photosensitive drum 2. A reflecting mirror 14 reflects a light flux to the synchronization detecting means 16. An imaging lens 15 images the light flux onto the synchronization detecting means 16. The light scanning apparatus 1 is formed while these members are accommodated in the optical housing 90 which is of a chassis.

Then, image position correcting means will be described. The image position correcting means is performed to the cyan, magenta, and yellow images with respect to displacements of parameters illustrated in FIGS. 14A to 14E based on a black image position. In FIGS. 14A to 14E, an arrow A indicates an image conveyance direction (conveyance direction of sheet S), and a main scanning direction is perpendicular to the conveyance direction A.

Figure 14A:
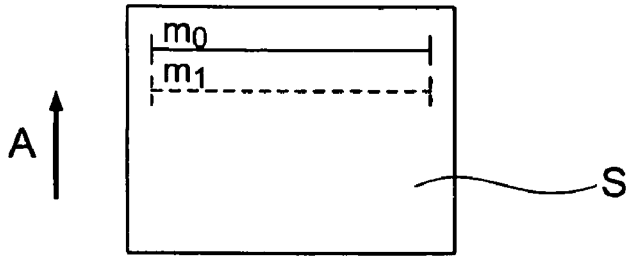
FIG. 14A to 14E are views illustrating an image misalignment parameter.
Figure 14B:
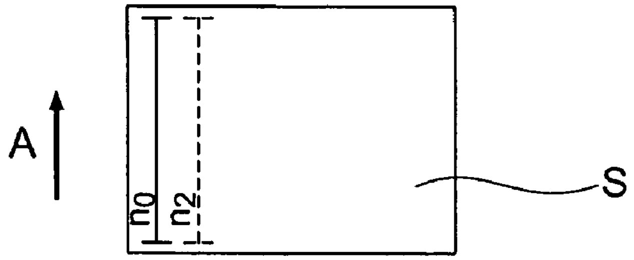

For a vertical margin displacement illustrated in FIG. 14A and a horizontal margin displacement illustrated in FIG. 14B, the image position correction is performed by changing the laser write timing by a necessary amount. For a magnification displacement illustrated in FIG. 14D, a frequency modulated by the laser diode 19 is changed by a predetermined amount to perform the image position correction.

Figure 14C:
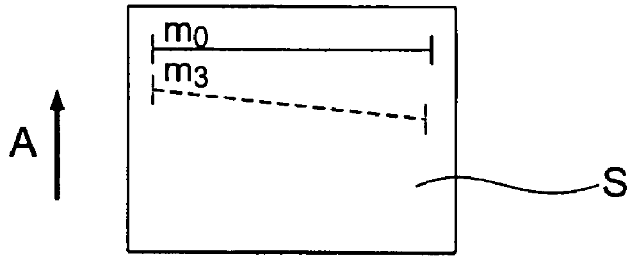
Figure 14D:
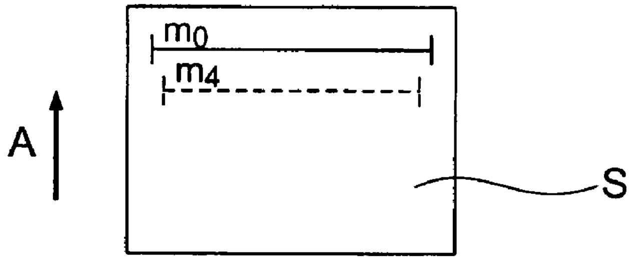
Figure 14E:
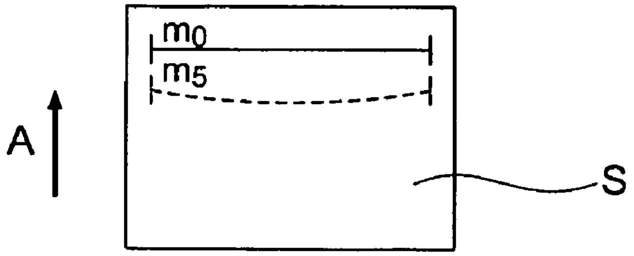

For scanning line inclination illustrated in FIG. 14C and scanning line bending illustrated in FIG. 14E, the image position correction is performed by an optical technique described below.

Scanning line inclination correction will be described with reference to FIG. 15.

Figure 15A:
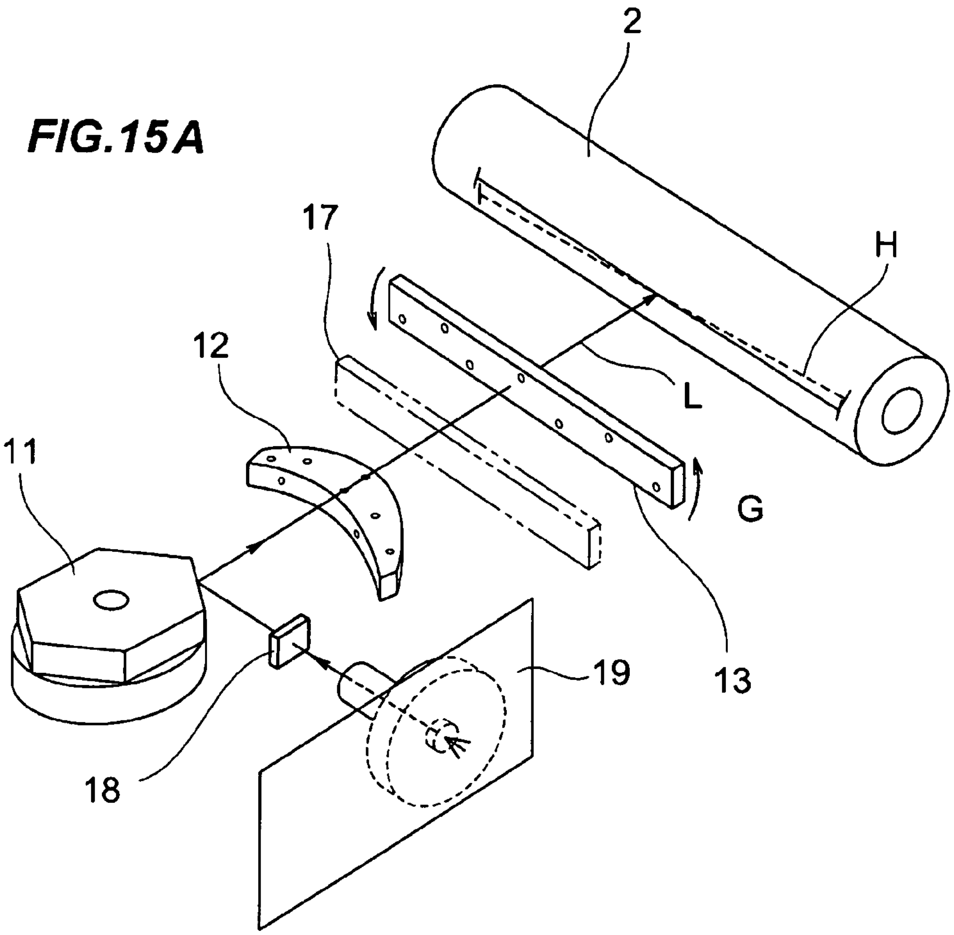
FIGS. 15A and 15B are explanatory views illustrating scanning line inclination shift correcting means.
Figure 15B:
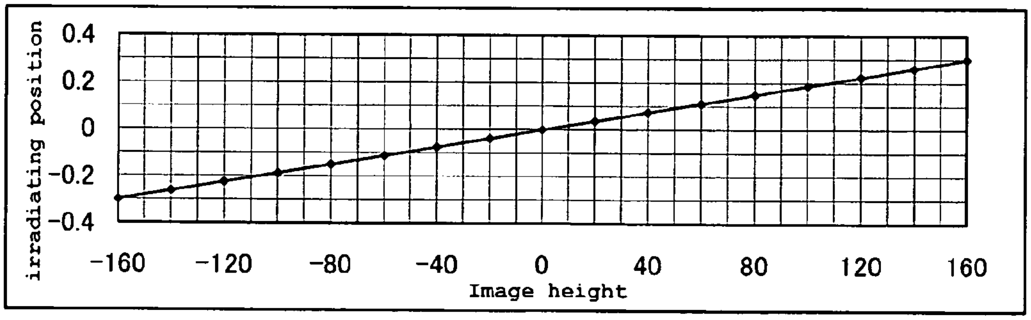

As shown in FIG. 15, when the diffraction element 13 is rotated in a direction of an arrow G about a position near an optical axis L, the light flux with which the photosensitive drum 2 is scanned is inclined as illustrated by a broken line H of FIG. 15A. The diffraction element 13 is disposed between the reflecting mirror 17 and the photosensitive drum 2.

As shown in FIG. 13B, when the diffraction element 13 is rotated by ten minutes in the direction of the arrow G, one of ends of the scanning line is changed by about 0.3 mm on the surface of the photosensitive drum 2 while the other end of the scanning line is reversely changed by about 0.3 mm.

Because the amount of rotation of the diffraction element 13 is substantially proportional to the amount of inclination of the scanning line, the diffraction element 13 is rotated by an amount necessary to correct the inclination displacement, which allows the scanning line inclination to be adjusted.

As shown in FIG. 13, a substantially central portion of the diffraction element 13 is rigidly bonded onto the retaining member 13*a*. Both end portions of a toric lens are pressed against a retaining member 13*a* by a spring (not shown) in order to prevent optical element deformation caused by a difference in linear expansion coefficient between the toric lens and the retaining member 13*a*. A shaft 13*b* provided in the retaining member 13*a* constitutes a rotation center of the toric lens. A pulse motor 13*c* controls the amount of rotation of the retaining member 13*a*, and a screw is formed in an output shaft of the pulse motor 13*c*. The screw is fitted in a slide member in which an internal thread is formed, and the diffraction element 13 is rotated in a direction of an arrow P to perform the inclination correction by the rotation of the motor. One of ends of a compression spring 13*d* presses a surface of the retaining member 13*a* facing the pulse motor against the pulse motor side, and the other end is pressed against a fixed portion such as a wall surface of the optical housing 90.

The scanning line inclination correcting means is mainly used in image misalignment correction (so-called automatic registration) between the image forming stations, a registration mark (not shown) formed on the intermediate transfer belt 6 is read by the registration mark detecting means 69 (see FIG. 12), and the correction is performed based on computation result.

Then, scanning line bending correction will be described with reference to FIG. 16. The scanning line bending correction is performed only in assembling the light scanning apparatus because the scanning line bending is not changed depending on a temperature in the image forming apparatus.

Figure 16A:
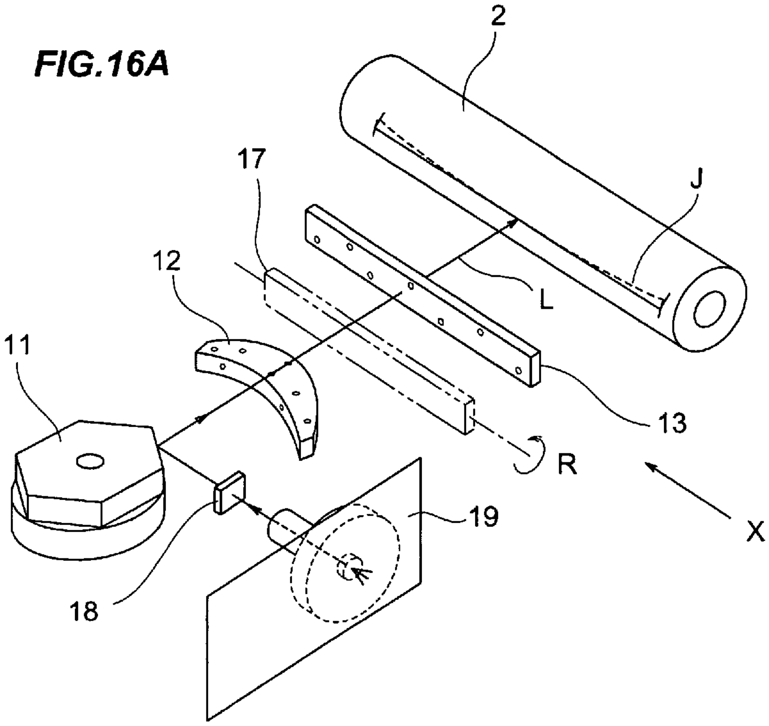
FIG. 16A to 16C are explanatory views illustrating scanning line bending correcting means of the first embodiment.
Figure 16C:
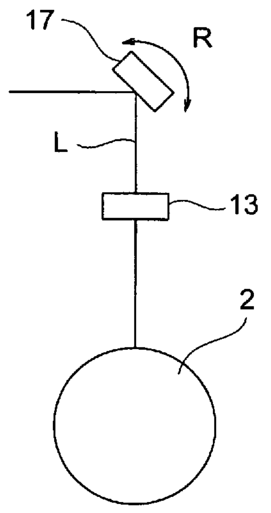

As shown in FIG. 16, the reflecting surface of the reflecting mirror 17 is rotated in the direction of the arrow R about the optical axis L to change an angle of the optical axis L of the light beam incident to the diffraction element 13, whereby the light flux with which the photosensitive drum 2 is scanned is bent as illustrated by a broken line J of FIG. 16A.

Figure 16B:
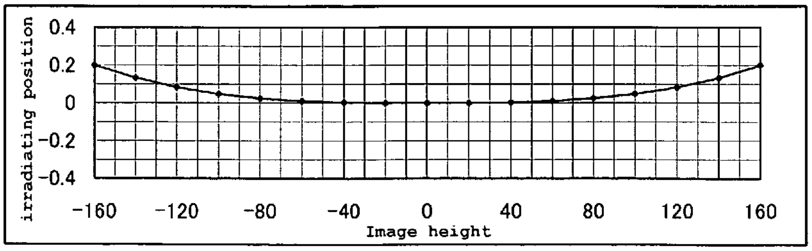

When the optical axis L of the light beam incident to the diffraction element 13 is rotated by 10 in the direction of the arrow R, right and left ends are bent by about 0.2 mm on the surface of the photosensitive drum 2 as shown in FIG. 16B.

Figure 17:
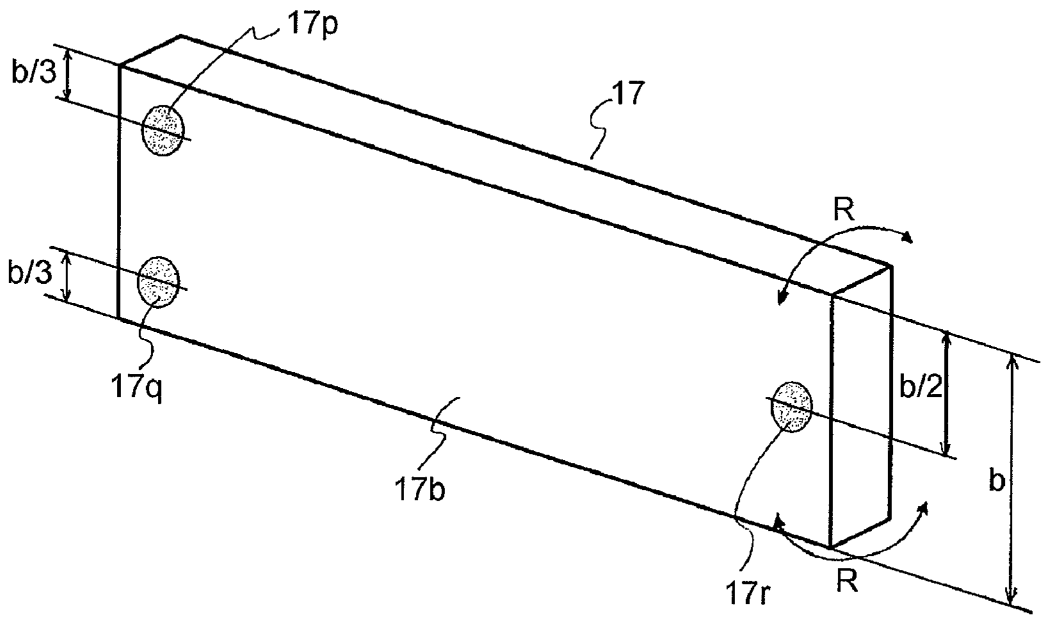
FIG. 17 is a perspective view illustrating a reflecting mirror support position.

A support configuration of the reflecting mirror 17 will be described below. In the light scanning apparatus 1, the reflecting mirror 17 reflects the light beam deflected by the deflection unit 11 toward the photosensitive drum 2 is formed in a so-called long mirror having a large aspect ratio. As shown in FIG. 17, in the reflecting mirror 17, one of end sides in a longitudinal direction is supported by two points while the other end is supported by a single point, and a reflecting surface 17*b* is aligned to secure flatness in displacing the reflecting mirror 17 in the light scanning apparatus 1.

Specifically, one of end sides in the longitudinal direction of the reflecting mirror 17 is supported by a projection (support member) integral with the optical housing 90 and a screw (support member) fitted in the optical housing 90. The other end in the longitudinal direction of the reflecting mirror 17 is supported by a screw (support member) fitted in the optical housing 90. In the case where the screw is hardly directly fitted in the housing 90 because the optical housing 90 is made of a resin material, the screw may be fitted in a different member attached to the optical housing 90.

As shown in FIG. 17, generally support positions 17*p* and 17*q* on the two-point support side of the reflecting mirror 17 are disposed not more than one-thirds of a crosswise length b from crosswise both ends of the reflecting mirror 17, and a support position 17*r* on the single-point support side is disposed in the substantially central portion in the crosswise direction of the reflecting mirror 17.

In the reflecting mirror 17 having the support configuration, the a feed mount of the screw is changed to rotate the reflecting mirror 17 in the direction of the arrow R of FIG. 16, which changes the angle of the optical axis L of the light beam incident to the diffraction element 13. The screw on the two-point support side is used to correct the scanning line bending in assembling the light scanning apparatus 1.

Figure 2:
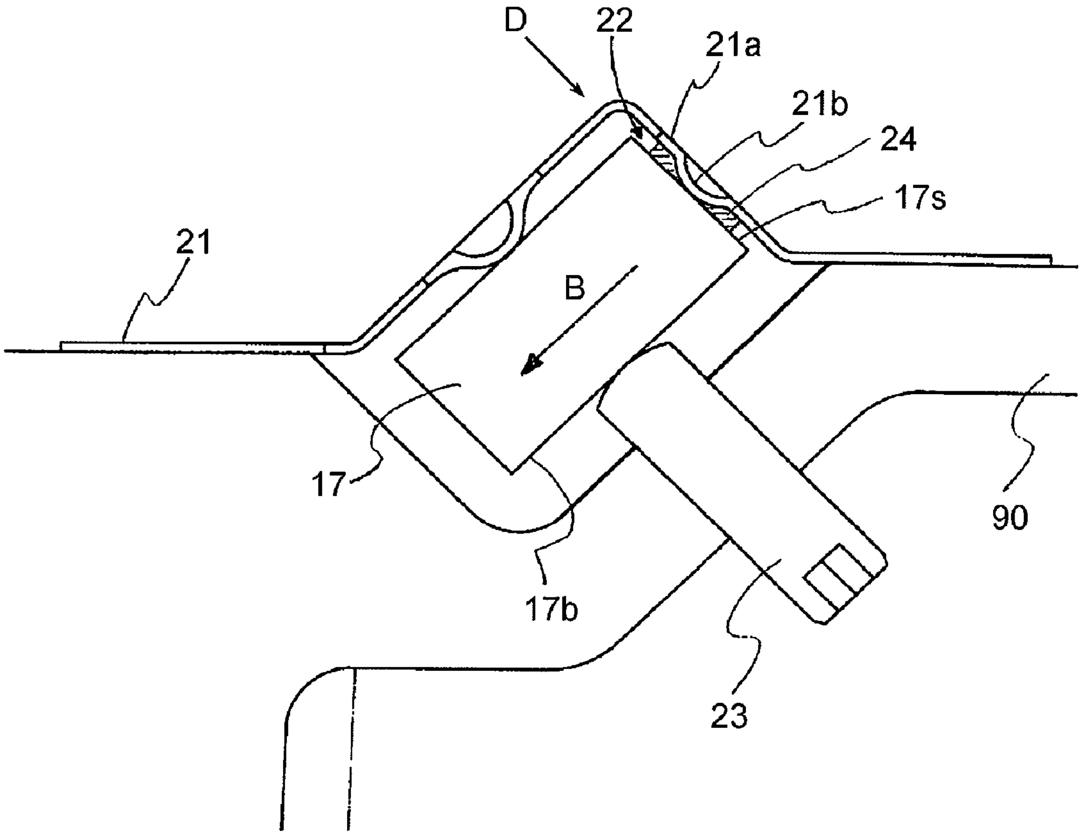
FIG. 2 is a sectional view illustrating the support configuration on the single-point support side of the reflecting mirror of the first embodiment.
Figure 3:
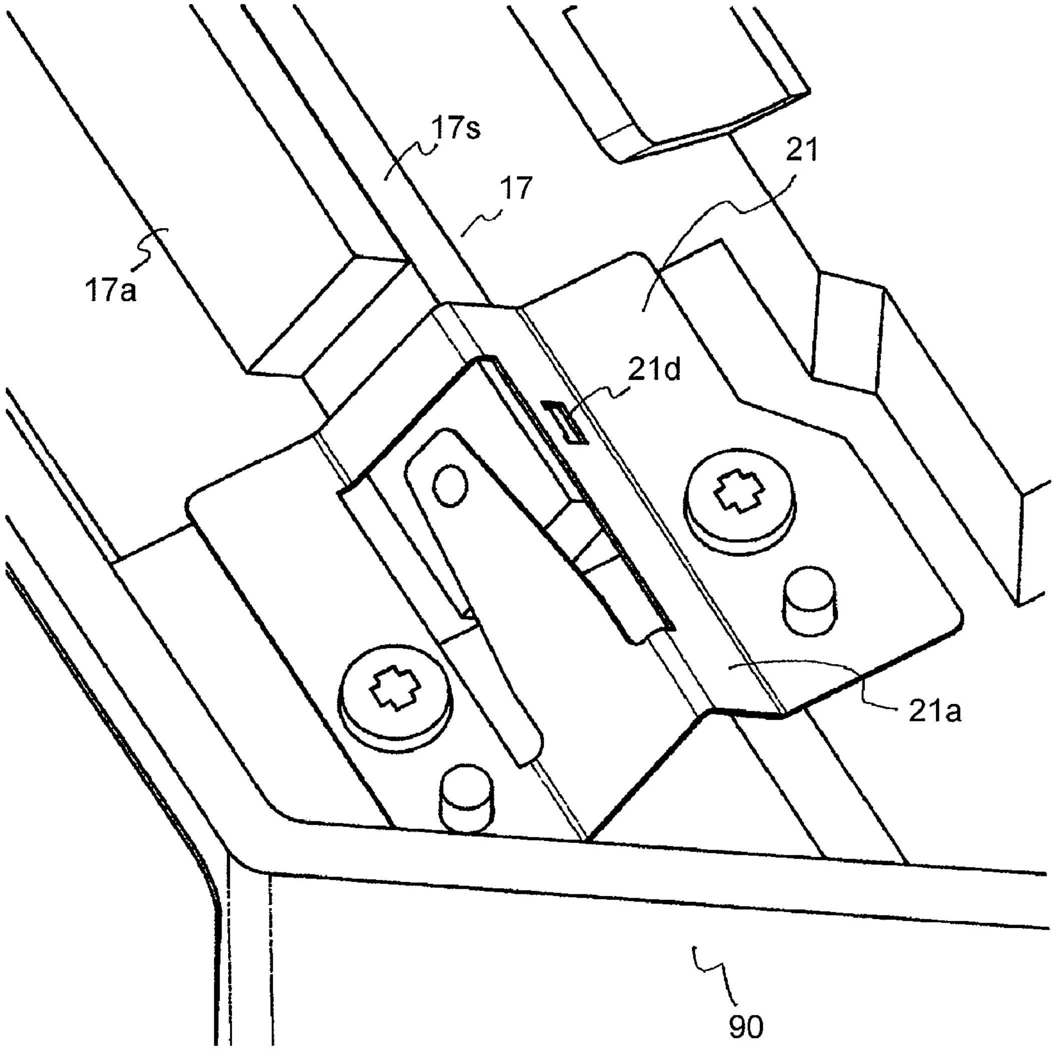
FIG. 3 is a perspective view illustrating the support configuration on the single-point support side of the reflecting mirror of the first embodiment.

FIG. 2 illustrates the support configuration on a screw 23 on the single-point support side in the screws which are of the support member.

As described above, the scanning line inclination can be corrected by the rotation of the diffraction element. However, it is necessary to increase a dynamic range to correct the inclination caused by a fluctuation in reflecting mirror position and a variation in inclination caused by the temperature rise of the image forming apparatus, which results in the increased thickness of the diffraction element.

In the diffraction element, there is a conjugate relationship between the reflecting surface of the deflection unit and the surface of the photosensitive drum. The reflecting mirror inclined in the longitudinal direction changes an optical path length from the reflecting surface of the deflection unit to the diffraction element in the scanning region. The uneven pitch or a displacement of lateral magnification is easily generated depending on the amount of fluctuation in angle (so-called surface fall-down) relative to the rotation angle of the reflecting surface of each deflection unit.

The slide member of the pulse motor is adjusted to a predetermined position. In this state of things, a screw 23 on the single-point support side is adjusted to control the reflecting mirror such that the scanning light incident to the diffraction element becomes parallel to the diffraction element.

Figure 1:
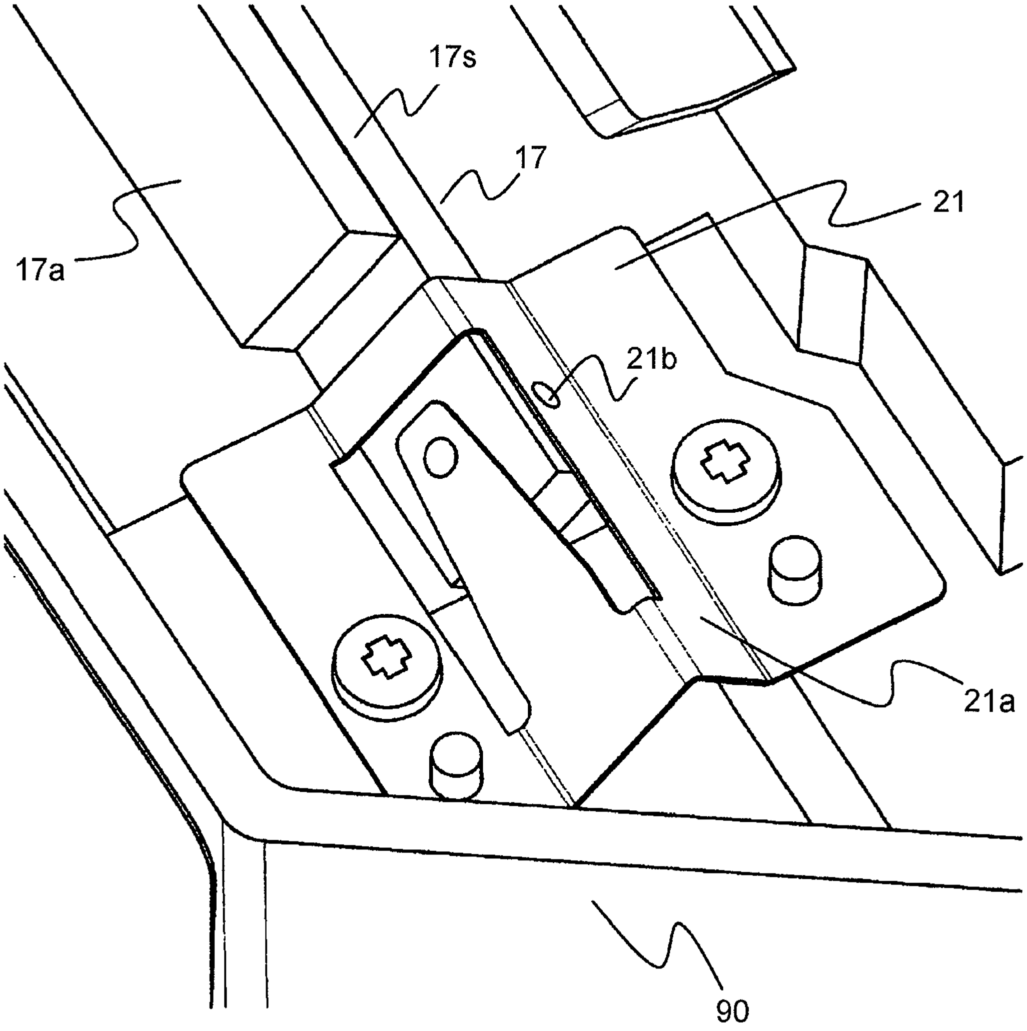
FIG. 1 is a perspective view illustrating a support configuration on a single-point support side of a reflecting mirror according to a first embodiment of the invention.

A support configuration of the reflecting mirror will be described with reference to FIGS. 1 and 2. FIG. 1 is a perspective view illustrating the support configuration on the other end side in the longitudinal direction of the reflecting mirror which is the single-point support side, and FIG. 2 is a sectional view illustrating the support configuration on the other end side in the longitudinal direction of the reflecting mirror.

Referring to FIG. 2, the screw 23 is the support member which supports the other end side in the longitudinal direction of the reflecting mirror 17 at the single point to align the reflecting surface 17*b* of the reflecting mirror 17. The screw 23 is fitted in the optical housing 90 to support the reflecting surface 17*b* of the reflecting mirror 17 on the other end side at the single point. As shown in FIG. 17, the reflecting mirror 17 supports one of the end sides in the longitudinal direction at the plural points (two points in FIG. 17).

An elastic member 21 (urging member 21) faces the screw 23 while the reflecting mirror 17 is interposed therebetween, and the elastic member 21 presses the reflecting mirror 17 against the screw 23. The elastic member 21 is formed by a plate spring. A planar portion 21*a* is provided opposite the side face of the reflecting mirror 17. The planar portion 21*a* is provided at a position where the planar portion 21*a* faces a longitudinal surface 17*s* perpendicular to a surface (opposite surface to the reflecting surface 17*b*) supported by the elastic member 21 of the reflecting mirror 17. At this point the planar portion 21*a* is integral with the plate spring 21 which is the elastic member. The planar portion 21*a* has a projection which can abut on the longitudinal surface 17*s* of the reflecting mirror 17. The projection of the planar portion 21*a* is formed by drawing. Specifically, the planar portion 21*a* includes a hemispherical drawing 21*b* (for example, height of 0.3 mm) projected toward the reflecting mirror 17.

As shown in FIG. 1, a vibration-proof glass 17*a* adheres to the backside (opposite surface to the reflecting surface 17*b*) of the reflecting mirror 17 to suppress bending vibration of the reflecting mirror. In FIG. 2, the vibration-proof glass is neglected. In the first embodiment, the reflecting mirror 17 (width of 10 mm, thickness of 5 mm, and weight of about 40 g) and the vibration-proof glass 17*a* (width of 10 mm, thickness of 5 mm, and weight of about 30 g) are illustrated in FIG. 1. However, the dimensions and weights of the reflecting mirror 17 and vibration-proof glass 17*a* are not limited to the first embodiment.

As shown in FIG. 2, after the scanning line bending and the scanning line inclination are corrected, a gap 22 between the longitudinal surface 17*s* and the planar portion 21*a* is fixed by a bonding agent 24 on the side on which the reflecting mirror 17 of FIG. 1 is supported at the single point.

Although the bonding agent is used as a viscous member in the case where the rotation vibration is suppressed using the bonding agent, a vibration damping effect for suppressing the rotation vibration is decreased when hardness of the bonding agent is lowered. The vibration damping effect can be enhanced by utilizing the bonding agent having the high hardness. However, generally the high-hardness bonding agent has high cure shrinkage and the variation in angle is easily generated by the fluctuation in cure shrinkage. The high-hardness and low-cure shrinkage bonding agent has the high viscosity and is inferior to workability for obtaining the necessary adhesive area.

Therefore, as described above, the drawing 21*b* which can abut on the longitudinal surface 17*s* of the reflecting mirror 17 is provided in the planar portion 21*a*, and the gap 22 between the longitudinal surface 17*s* and the planar portion 21*a*, i.e., the surroundings of the drawing 21*b* is filled with the bonding agent 24. Then, the bonding agent is hardened to fix the longitudinal surface 17 to the planar portion 21*a*. Therefore, because the hemispherical drawing 21*b* is disposed in the gap 22 between the longitudinal surface 17*s* and the planar portion 21*a*, the bonding agent 24 remains around the drawing 21*b* by an effect of surface tension, and dripping of the bonding agent 24 can be prevented on a depth side in an application direction (gravitational direction) of the bonding agent 24.

Additionally, the cure shrinkage of the bonding agent can be regulated by applying the bonding agent 24 to the surroundings of the drawing 21*b* of the planar portion 21*a*. This enables the use of the bonding agent having the higher hardness. The drawing 21*b* which is of the projection is fixed while an outer peripheral portion of the abutting portion abutting on the reflecting mirror 17 is filled with the bonding agent, so that deformation of the bonding agent 24 in the rotation vibration direction of the reflecting mirror 17, i.e., deformation in a shearing direction can be regulated. That is, even if the bonding agent 24 is deformed by the rotation of the mirror, the drawing 21*b* regulates the deformation of the bonding agent, so that the deformation of the bonding agent can be suppressed. Therefore, the sufficient vibration damping effect can be obtained even if the bonding agent having the low hardness is used.

In addition to the suppression of the cure shrinkage of the bonding agent, the drawing 21*b* of the planar portion 21*a* can suppress the amount of deformation of the bonding agent when the bonding agent having the low hardness is used. Accordingly, the rotation vibration suppressing effect can sufficiently be obtained in the reflecting mirror 17.

Although the ultra-violet setting bonding agent is used as the bonding agent in the first embodiment, the invention is not limited to the ultra-violet setting bonding agent. The bonding agent may be applied using a tool such as a syringe, or the bonding agent may be caused to drop in the gap 22 between reflecting mirror 17 and the plate spring 21 and saturated by utilizing capillarity. When the drop of the bonding agent is performed while the reflecting mirror 17 is located on the opposite side to the planar portion 21*a* (direction of an arrow B), because the gap 22 is broadened, the gap 22 is filled with the bonding agent 24 without overflow of the bonding agent 24 (drip-off on the reflecting surface).

After the bonding agent is applied, the longitudinal surface 17*s* of the reflecting mirror 17 is caused to abut on the drawing 21*b* of the planar portion 21*a*, and the bonding agent is hardened by irradiating the bonding agent with the ultraviolet ray. Thus, in the first embodiment, the drawing 21*b* is caused to abut on the longitudinal surface 17*s* of the reflecting mirror 17, and the gap 22 between the longitudinal surface 17*s* and the planar portion 21*a* is fixed by the bonding agent 24.

Figure 18:
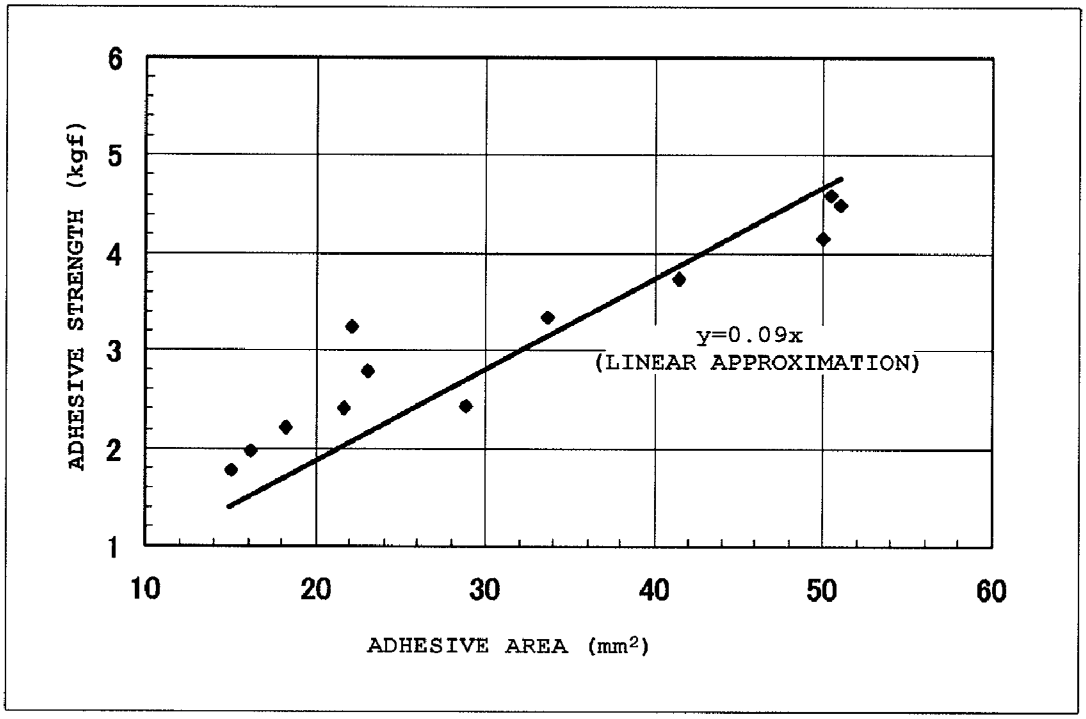
FIG. 18 is a view illustrating a relationship between an adhesive area and an adhesive strength.

Because the adhesive strength of 2 kgf is required for the reflecting mirror 17 (including vibration-proof glass 17*a*) having the total weight of 70 g, the adhesive area of about 22 $mm^2$ is required according to a relationship between the adhesive strength and adhesive area illustrated in FIG. 18. FIG. 18 illustrates the relationship between the adhesive area and the adhesive strength. As shown in FIG. 18, the substantially proportional relationship exists between the adhesive area and the adhesive strength, and the adhesive strength is increased with increasing adhesive area.

A design area where the longitudinal surface 17*s* of the reflecting mirror 17 overlaps the planar portion 21*a* of the plate spring 21 becomes 63 $mm^2$ (14 mm×4.5 mm), so that the sufficient adhesive strength can be obtained by securing the adhesive area not lower than one-thirds of the design area.

In the gap 22 between the longitudinal surface 17*s* and the planar portion, because the drawing 21*b* of the planar portion 21*a* abuts on the longitudinal surface 17*s*, a height (for example, 0.3 mm) of the drawing 21*b* becomes the gap 22. Therefore, in the first embodiment, when the amount of bonding agent not lower than 6.6 $mm^3$ (22 $mm^2$×0.3 mm) is applied, and when a mass of the bonding agent not lower than 6.5 mg (6.6×0.98) is applied because the bonding agent has a specific gravity of 0.98, management can easily be performed.

Figure 4:
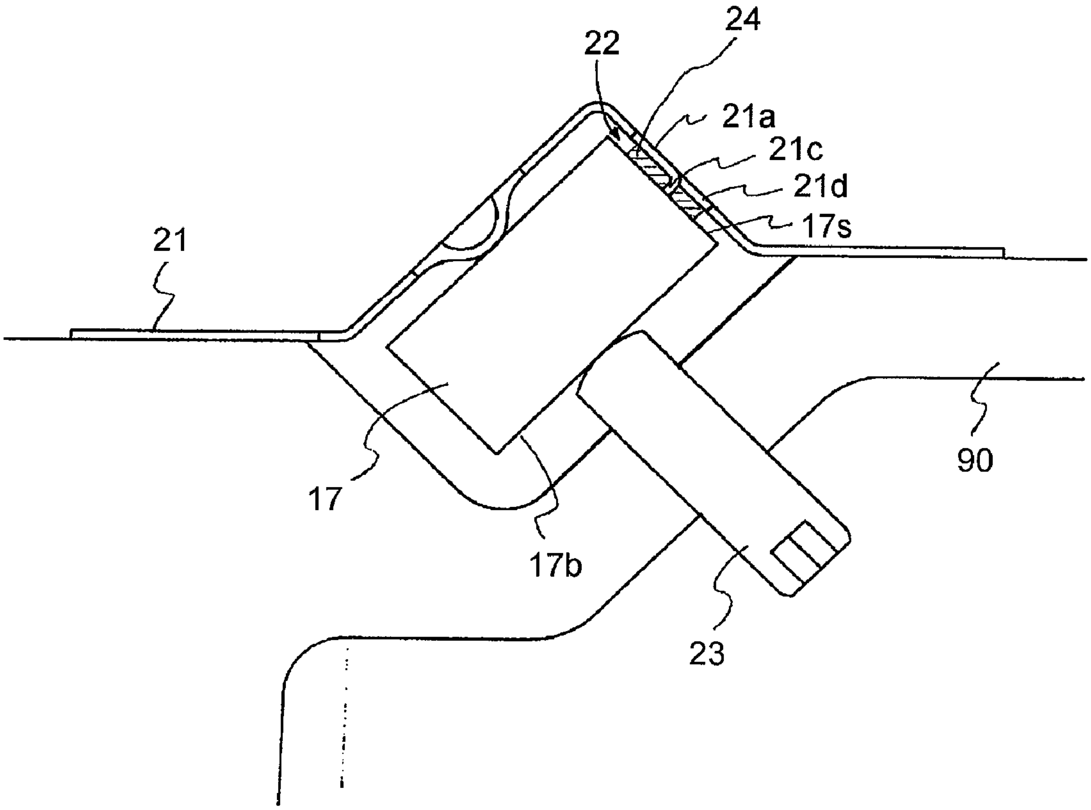
FIG. 4 is a sectional view illustrating the support configuration on the single-point support side of the reflecting mirror of the first embodiment.

The projection of the planar portion 21*a* is not limited to the hemispherical drawing 21*b*, but bending 21*c* formed by bending may be used as shown in FIG. 4. In this case, an edge line at a front end of the bending 21*c* abutting on the reflecting mirror 17 is formed so as to be substantially perpendicular to the thickness direction of the reflecting mirror 1. Therefore, the variation in angle can be prevented in bonding the mirror by following the portion (planar portion 21*a*) facing the bonding surface (longitudinal surface 17*s*) of the reflecting mirror 17 similar to the case in which the projection is not formed.

A planar facing portion 21*a* and a notch 21*d* generated inside by vertically bending the bending 21*c* are sequentially disposed when viewed from the direction (direction of the arrow D) in which the bonding agent 24 is applied (drops in). Therefore, when the bonding agent 24 flows by the gravity, the capillarity acts on the gap between the longitudinal surface and the planar facing portion 21*a* to prevent the bonding agent 24 from flowing into the place where the planar facing portion 21*a* does not exist. The bonding agent 24 is held back by the bending 21*c* to run around the bending 21*c* (however, because the capillarity acts on the bonding agent 24, the bonding agent 24 does not run around the place where the planar portion does not exist).

As to the abutment between the longitudinal surface 17*s* of the reflecting mirror 17 and the drawing 21*b* of the planar portion 21*a*, it is not completely necessary that the longitudinal surface 17*s* of the reflecting mirror 17 abut on the drawing 21*b* of the planar portion 21*a*, the effect of the first embodiment can be obtained even if a bonding agent layer having the thickness of about 50 μm exists between the reflecting mirror 17 and a vertex of the drawing 21*b*.

As described above, according to the first embodiment, the planar portion 21*a* and the longitudinal surface 17*s* of the reflecting mirror 17 are rigidly bonded by the bonding agent 24 while the drawing 21*b* receives the longitudinal surface 17*s* of the reflecting mirror 17, so that the large adhesive area can be secured to obtain the sufficient adhesive strength. Therefore, not only the rotation vibration of the reflecting mirror due to the vibration in driving the apparatus can be suppressed, but also the peel-off of the bonding agent due to the impact during shipping can be suppressed.

The longitudinal surface 17*s* of the reflecting mirror 17 and the planar portion 21*a* facing the longitudinal surface 17*s* are rigidly bonded by the bonding agent 24 such that the drawing 21*b* receives the longitudinal surface 17*s* of the reflecting mirror 17. Therefore, the longitudinal surface 17*s* of the reflecting mirror 17 does not follow the planar portion 21*a*, and the variation in angle can be prevented in bonding the mirror.

Second Embodiment

Figure 5:
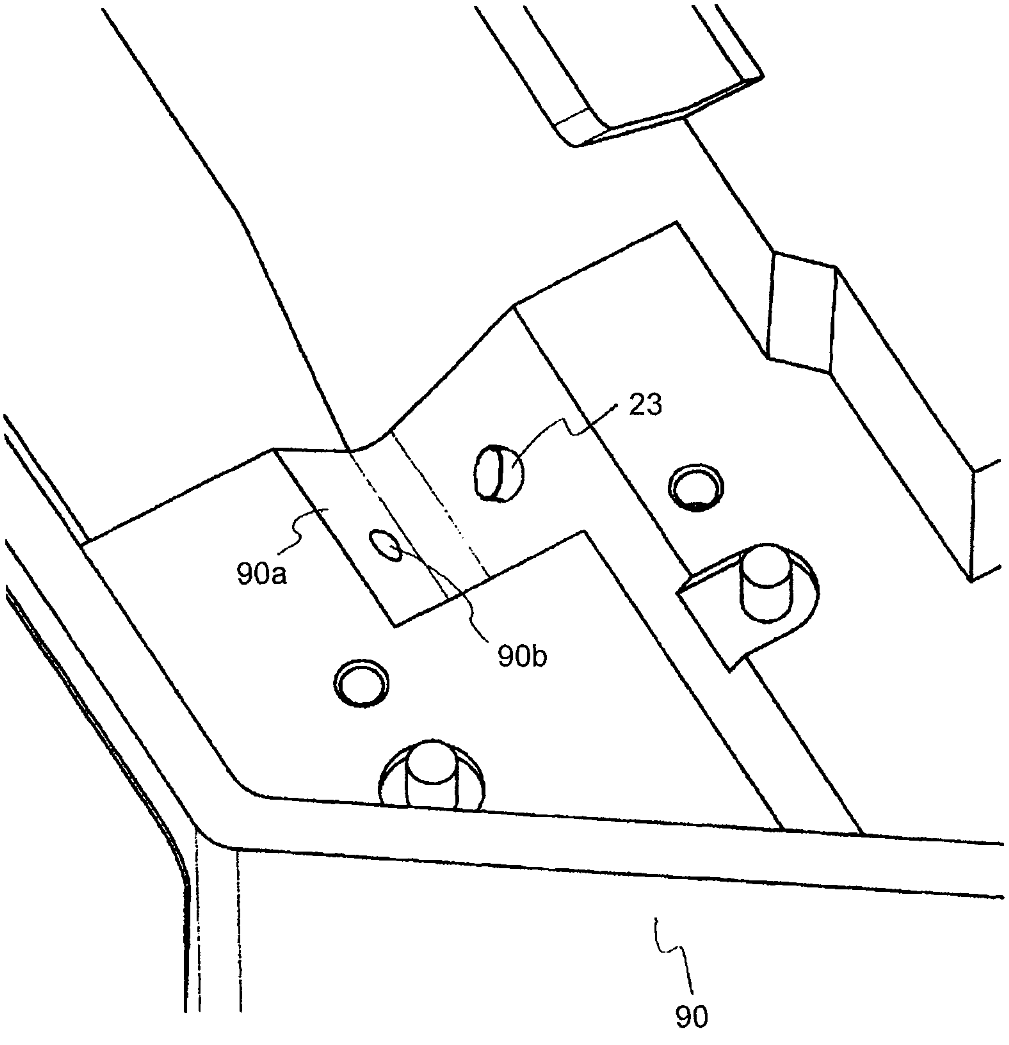
FIG. 5 is a perspective view illustrating a support configuration on a single-point support side of a reflecting mirror according to a second embodiment of the invention.
Figure 6:
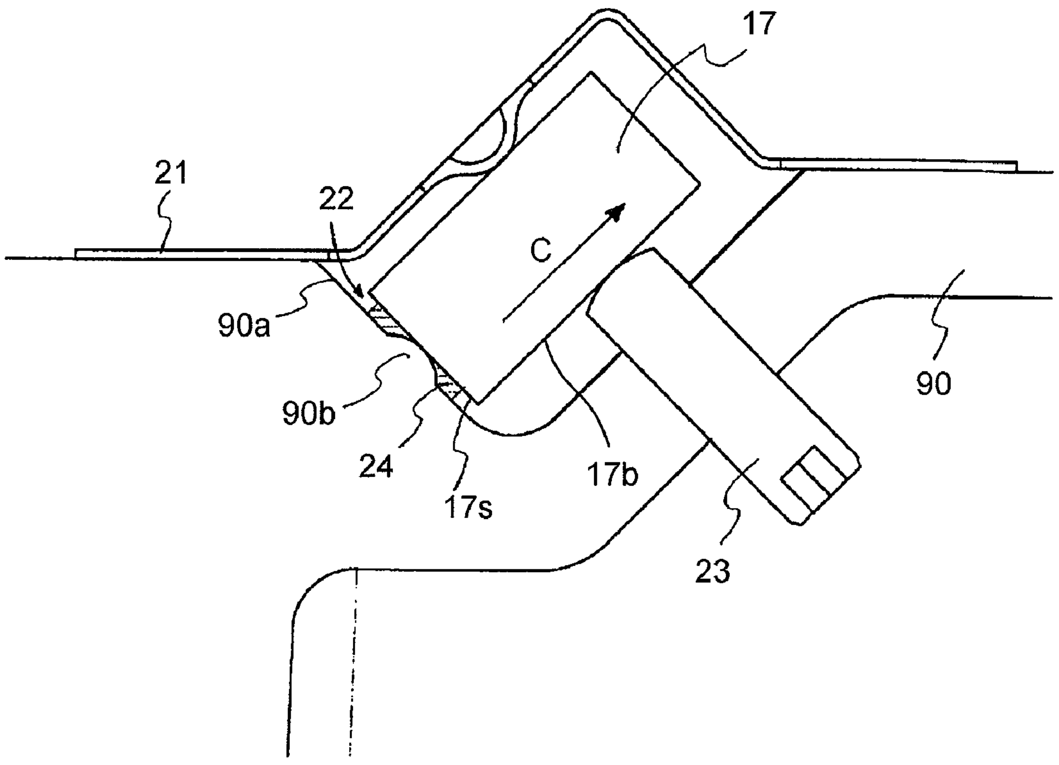
FIG. 6 is a sectional view illustrating the support configuration on the single-point support side of the reflecting mirror of the second embodiment.
Figure 7:
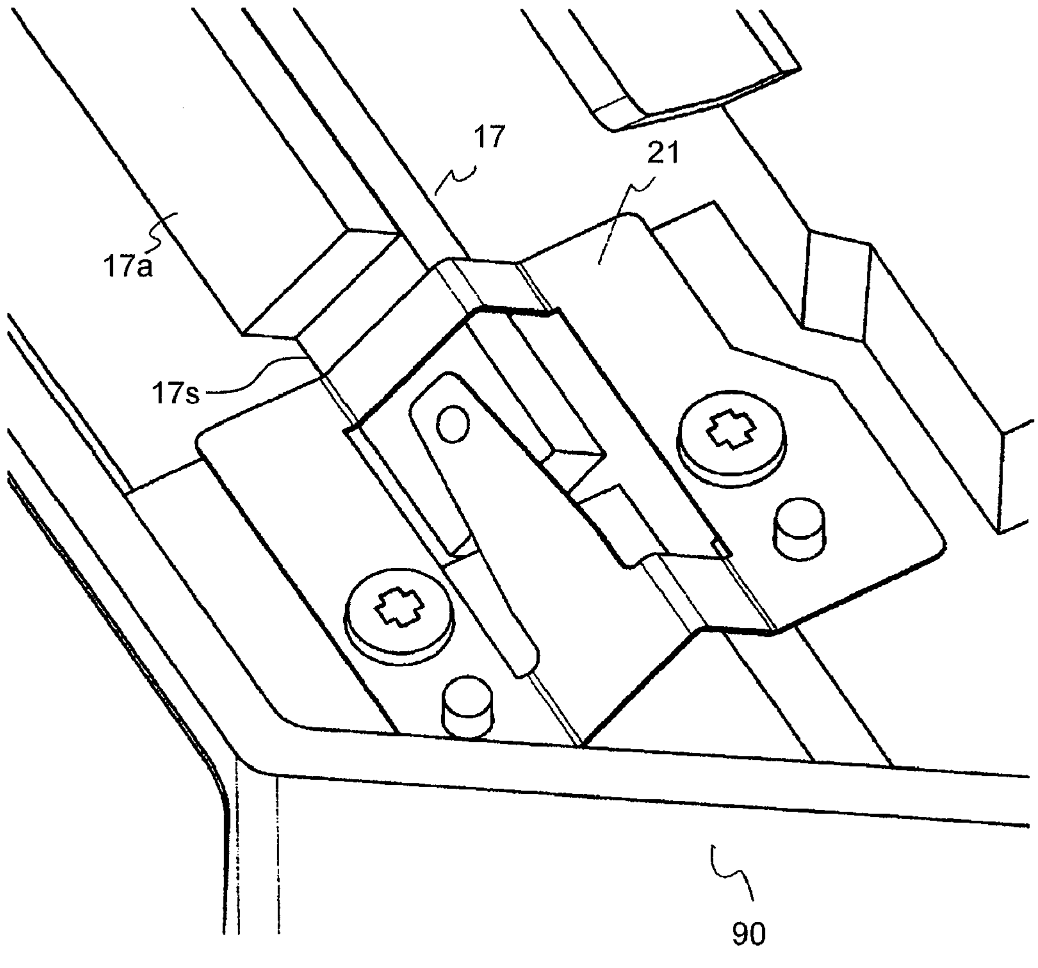
FIG. 7 is a perspective view illustrating the support configuration on the single-point support side of the reflecting mirror of the second embodiment.

A support configuration of a reflecting mirror according to a second embodiment of the invention will be described with reference to FIGS. 5 to 7. FIG. 5 is a perspective view illustrating only an optical housing 90. FIG. 6 is a sectional view illustrating the optical housing 90 along with the reflecting mirror 17 and elastic member 21. FIG. 7 is a perspective view illustrating a main part in a state in which the reflecting mirror and the plate spring are attached. Other configurations except for the support configuration of the reflecting mirror are similar to those of the first embodiment, so that the description is neglected.

As shown in FIGS. 5 and 6, in the optical housing 90 which is of the chassis, a planar portion 90*a* is integrally provided opposite the longitudinal surface 17*s* of the reflecting mirror 17. The planar portion 90*a* includes a hemispherical projection 90*b* which can abut on the longitudinal surface 17*s* of the reflecting mirror 17. For example, the hemispherical projection 90*b* has a height of 0.3 mm.

In the second embodiment, similarly to the first embodiment, the gap 22 between the longitudinal surface 17*s* of the reflecting mirror 17 and the planar portion 90*a* of the optical housing 90 is fixed by the bonding agent 24 after the scanning line bending and inclination are corrected. In the second embodiment, the planar portion 90*a* is bonded while facing the side face of the reflecting mirror 17.

During the drop of the bonding agent, when the reflecting mirror 17 is located on the opposite side to the planar portion 90*a* (direction of the arrow C), because the gap 22 is broadened, the gap 22 is better filled with the bonding agent.

As shown in FIG. 7, in the second embodiment, the projection is not provided in the plate spring 21, and therefore the planar portion is not required to provide the projection.

Figure 8:
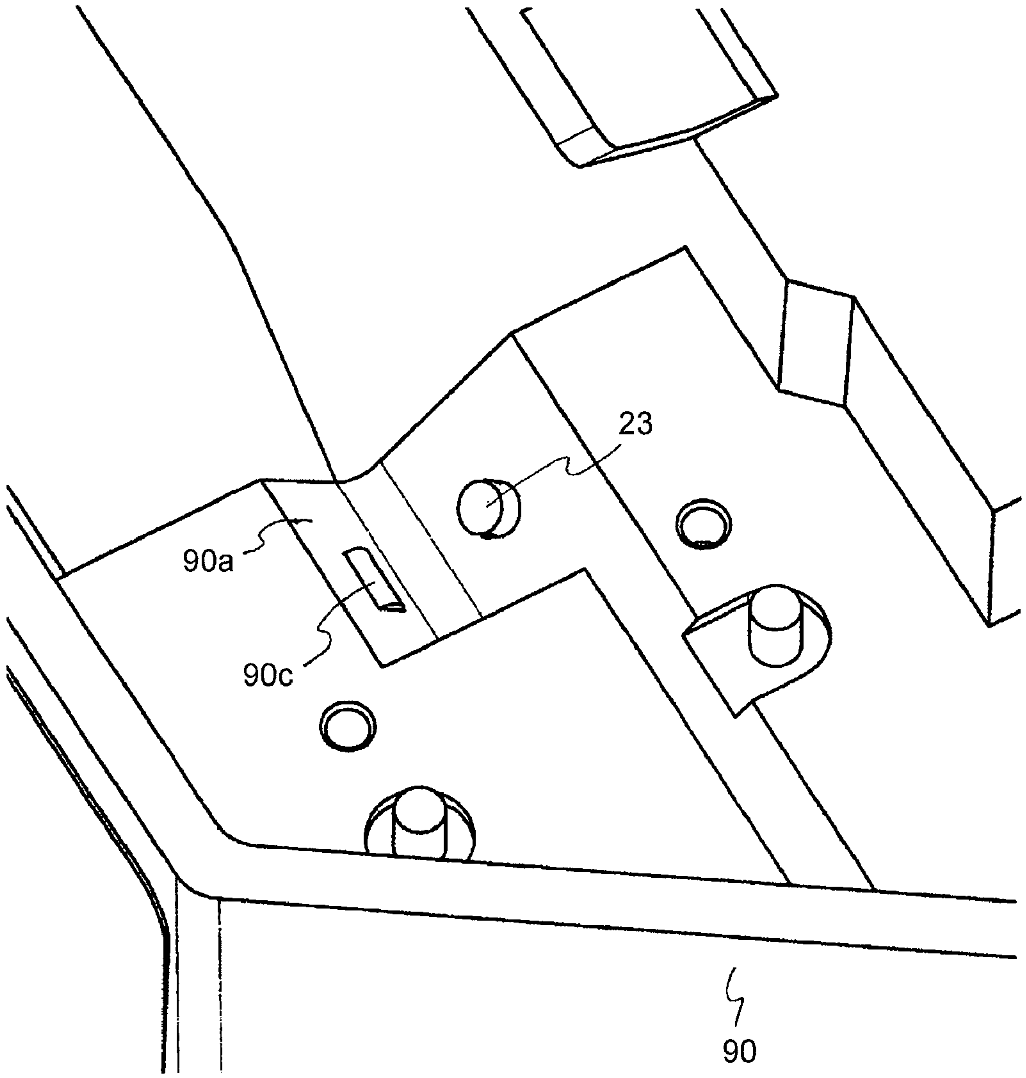
FIG. 8 is a perspective view illustrating the support configuration on the single-point support side of the reflecting mirror of the second embodiment.
Figure 9:
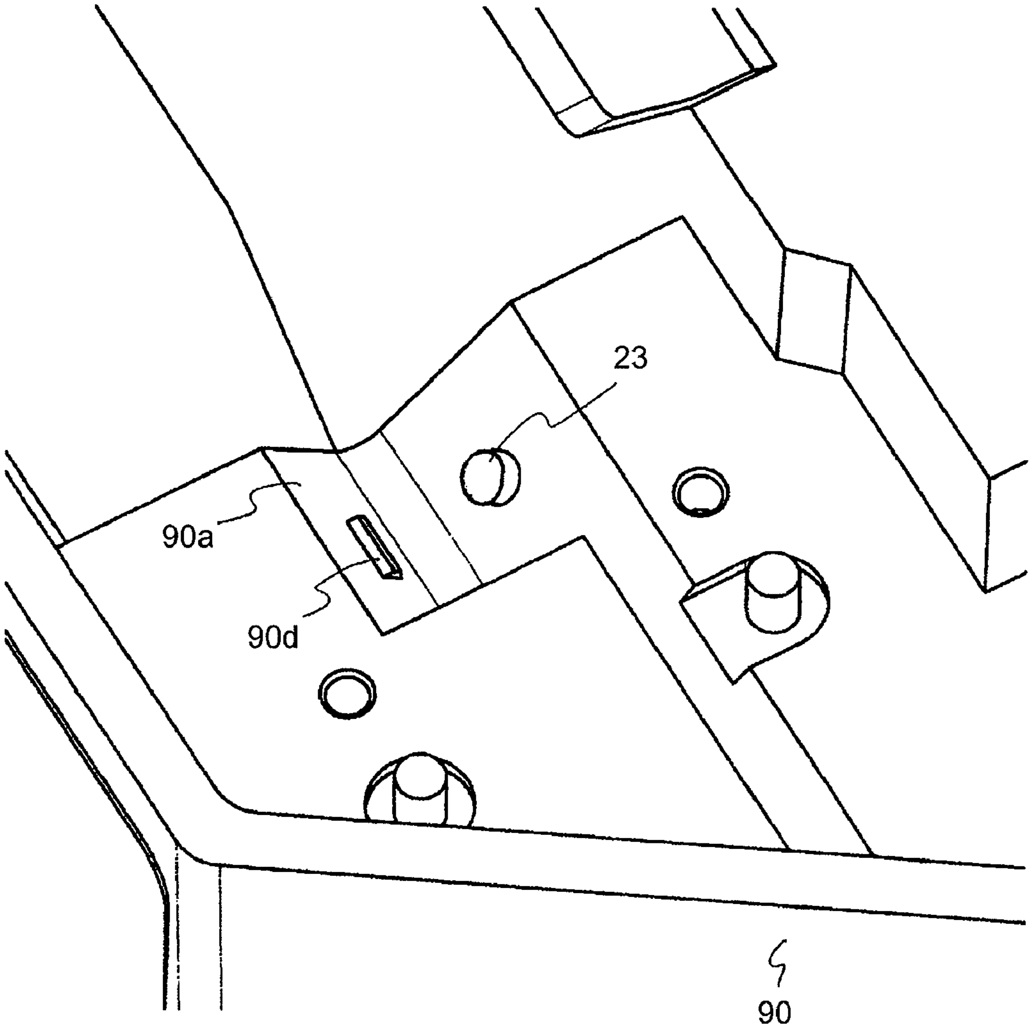
FIG. 9 is a perspective view illustrating the support configuration on the single-point support side of the reflecting mirror of the second embodiment.
Figure 10:
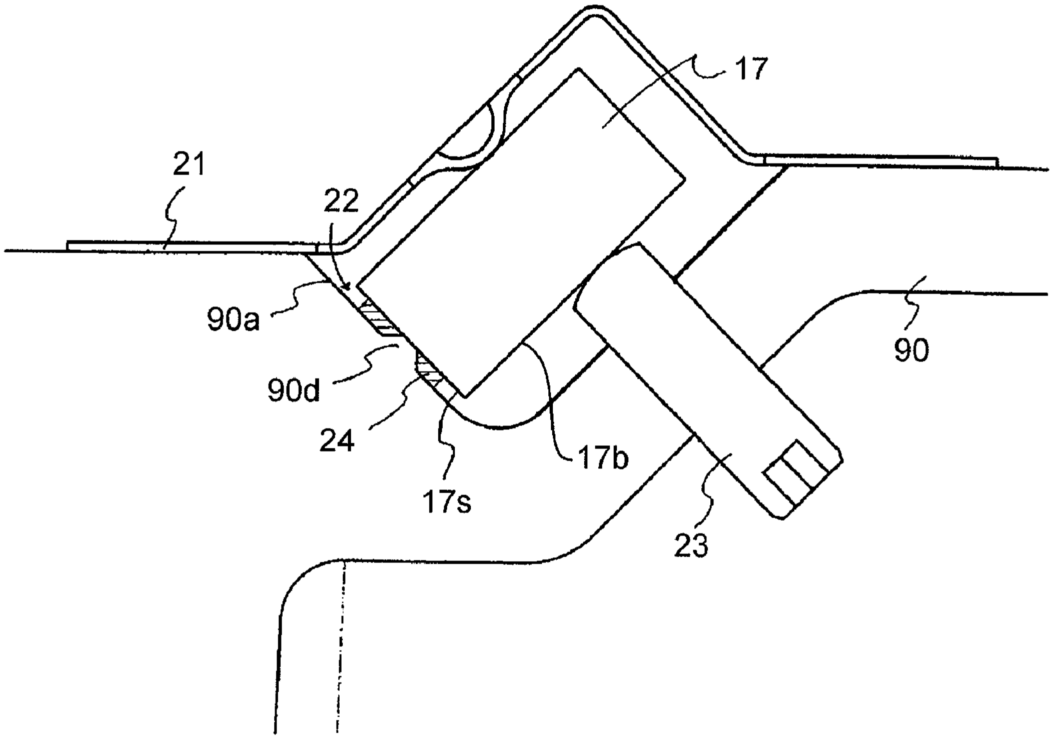
FIG. 10 is a sectional view illustrating the support configuration on the single-point support side of the reflecting mirror of the second embodiment.

Similarly to the first embodiment, the projection of the optical housing 90 is not limited to the hemisphere. For example, the projection of the optical housing 90 may be formed in a cylindrical projection 90*c* as shown in FIG. 8, or the projection of the optical housing 90 may be formed in a trapezoidal projection 90*d* having a micro plane as shown in FIGS. 9 and 10.

In this case, the edge line of the projection of the planar portion 90*a* abutting on the longitudinal surface 17*s* of the reflecting mirror 17 is formed so as to be substantially perpendicular to the thickness direction of the reflecting mirror 17. Therefore, the variation in angle can be prevented in bonding the mirror by following the portion (planar portion 90*a*) facing the bonding surface (longitudinal surface 17*s*) of the reflecting mirror 17 similar to the case in which the projection is not formed.

As described above, the planar portion 90*a* facing the longitudinal surface 17*s* of the reflecting mirror 17 or the projection disposed in the gap 22 between the planar portion 90*a* and the longitudinal surface 17*s* may be integral with not the elastic member 21 but the optical housing 90. The same effect as the embodiments is obtained by the configuration.

Third Embodiment

Figure 11:
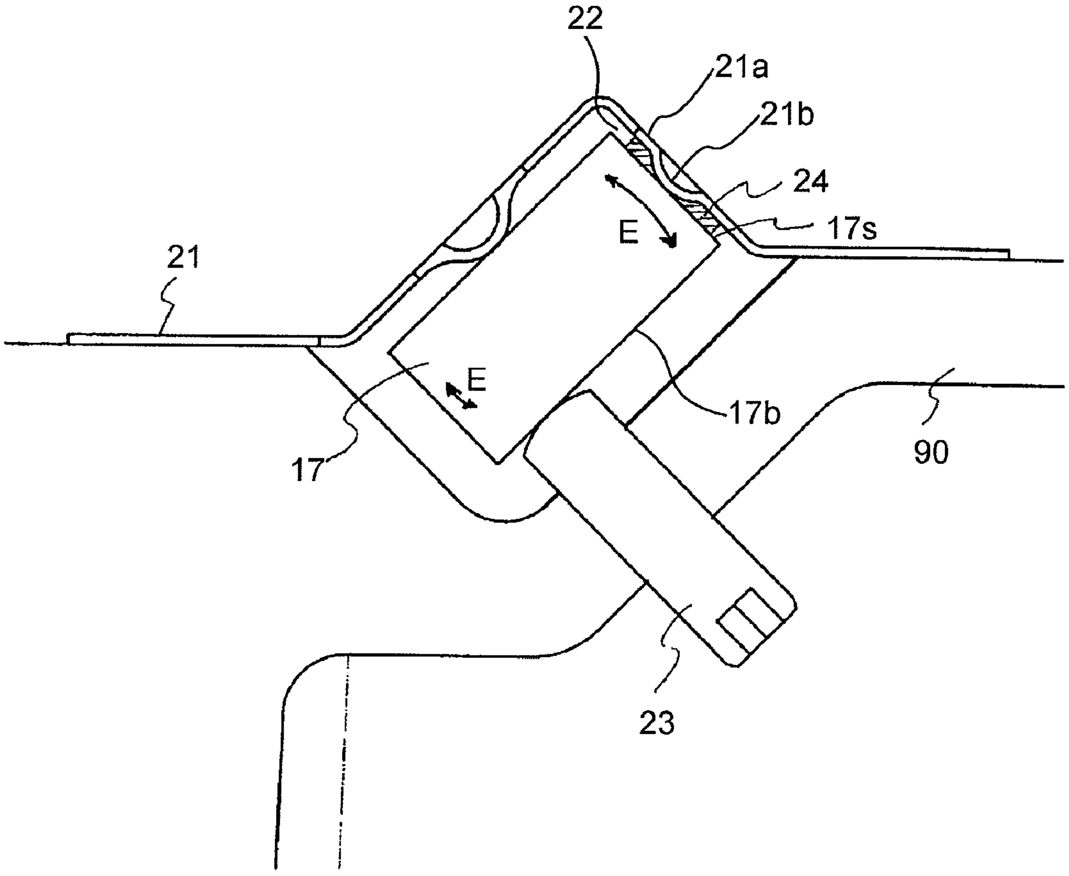
FIG. 11 is a sectional view illustrating a support configuration on a single-point support side of a reflecting mirror according to a third embodiment of the invention.

A support configuration of a reflecting mirror according to a third embodiment of the invention will be described with reference to FIG. 11. FIG. 11 is a sectional view illustrating the support configuration including the reflecting mirror 17 and the elastic member 21. Other configurations except for the support configuration of the reflecting mirror are similar to those of the first embodiment, so that the description is neglected.

As shown in FIG. 11, in the third embodiment, the screw 23 which is of the support member supporting the other end side in the longitudinal direction of the reflecting mirror 17 at the single point supports the position which is shifted with respect to the center in the crosswise direction (orthogonal direction to the longitudinal of the reflecting member) of the reflecting mirror 17. In this case, the side farther than the support point (support position of screw 23) of the reflecting mirror 17 is larger than the side near the support point in amplitude of the rotation vibration. Accordingly, the planar portion is provided opposite the longitudinal surface 17*s*on the side farther from the support position of the screw 23. The planar portion 21*a* integral with the plate spring 21 is illustrated in FIG. 11. The gap between the longitudinal surface 17*s* on the side farther from the support point and the planar portion 21*a* of the plate spring 21 facing the longitudinal surface 17*s* can be fixed by the bonding agent 24.

Contrary to the configuration illustrated in FIG. 11, in the case where the screw 23 is provided on the plate spring from the center in the crosswise direction of the reflecting mirror 17, the planar portion can be provided and bonded on the side of the optical housing 90 which is located farther from the support point.

Thus, even if the support position of the screw 23 is biased with respect to the center in the crosswise direction of the reflecting mirror 17, the planar portion is provided opposite the mirror longitudinal surface 17*s* on the side farther from the support position of the screw 23, which obtains the same effect as the embodiments.

Other Embodiments

In the embodiments, the light scanning apparatus is described by illustrating the image forming apparatus including the four image forming stations. The number of image forming stations and the number of pieces of light scanning apparatus corresponding to the image forming stations are not limited to the embodiments. The light scanning apparatus and the corresponding image forming station may appropriately be provided if need.

In the embodiments, the copying machine is illustrated as the image forming apparatus. The invention is not limited to the embodiments, but the image forming apparatus may be another image forming apparatus such as a printer and a facsimile or another image forming apparatus such as a multifunction peripheral in which these functions are combined. The same effect as the embodiments can be obtained by applying the invention to the light scanning apparatus used in these pieces of image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-027956, filed Feb. 7, 2007, which is hereby incorporated by reference herein in its entirety.

What is claimed is:

1. A light scanning apparatus comprising:

a deflection unit which performs scanning while deflecting a light beam emitted from a light source;

a reflecting member which reflects the light beam deflected by the deflection unit toward an object to be scanned;

a support member which supports a reflecting surface of the reflecting member;

an urging member which urges the reflecting member against the support member;

an optical box which accommodates in the reflecting member; and a projection which abuts on a longitudinal side of the reflecting surface of the reflecting member, the projection being fixed to the reflecting member by filling an outer peripheral portion of an abutting portion abutting on the reflecting member with a bonding agent.

2. The light scanning apparatus according to claim 1, wherein the projection is provided on the urging member.

3. The light scanning apparatus according to claim 2, wherein the urging member is a plate spring, and the projection is formed by drawing or bending the plate spring.

4. The light scanning apparatus according to claim 1, wherein, in the support member, one of end sides in a longitudinal direction of the reflecting member is supported by a plurality of points, the other end side is supported by a single point, and the projection is provided on the other end side.

5. The light scanning apparatus according to claim 4, wherein, when the support member supporting the other end side in the longitudinal direction of the reflecting member at the single point supports a position shifted with respect to a center in an orthogonal direction to the longitudinal direction of the reflecting member, the projection is provided opposite that one of the two longitudinal sides of the reflecting surface of the reflecting member which is away from a support position of the support member.

* * * * *